United States Patent
Hon et al.

(10) Patent No.: US 6,185,608 B1
(45) Date of Patent: Feb. 6, 2001

(54) CACHING DYNAMIC WEB PAGES

(75) Inventors: Lenny K. Hon, Waterloo; Leon Kuperman, Thornhill; Louis S. Mau, Burnaby; Alexander Mohelsky, Toronto, all of (CA)

(73) Assignee: International Business Machines Corporation, Armonk, NY (US)

( * ) Notice: Under 35 U.S.C. 154(b), the term of this patent shall be extended for 0 days.

(21) Appl. No.: 09/096,305

(22) Filed: Jun. 12, 1998

(51) Int. Cl.[7] ............................. G06F 13/38; G06F 15/17
(52) U.S. Cl. ............................................. 709/216; 707/10
(58) Field of Search .................................... 709/203, 245, 709/229, 205, 246, 248, 213–216; 707/203, 10

(56) References Cited

U.S. PATENT DOCUMENTS

| | | | |
|---|---|---|---|
| 5,920,725 | * 7/1999 | Ma et al. | 707/203 |
| 5,991,773 | * 11/1999 | Tagawa | 707/203 |
| 6,003,087 | * 12/1999 | Housel, III et al. | 709/229 |
| 6,016,512 | * 1/2000 | Huitema | 709/245 |

OTHER PUBLICATIONS

Active transaction integrated with real–time transactions according to data freshness, Shimakawa et al., ieeexplore.ieee.org, pp. 321–328 and, 1997.*

A distributed web server and its performance analysis on multiple platforms, Liu et al., ieeexplorer.ieee.org, pp. 665–672, 1996.*

* cited by examiner

Primary Examiner—Mark Rinehart
Assistant Examiner—Bunjob Jaroenchonwanit
(74) Attorney, Agent, or Firm—Jeanine S. Ray-Yarletts

(57) ABSTRACT

Web pages for commercial applications, such as electronic retail, are built "on-the-fly" in Hypertext Markup Language (HTML) from product data stored in the merchant's database. To reduce costs in time and computing resources and to improve customer access to data from the merchant's web site, pages created in HTML are cached on the merchant server. On a customer request for a page, the merchant server checks the cache first for the page, and if it isn't found there, generates a new page from the database. To maintain the validity of the content of the cached pages, the database tables include triggers that cause identifying information for any changes made on the stored data to be forwarded to a cache log. A synchronization daemon walks the cache log from time to time to locate pages that should be purged from the cache because their content is no longer synchronous with the data stored in the database. By setting preferences for identifiable customers in advance, data generated from the database can be selected for specific customer groups.

14 Claims, 4 Drawing Sheets

CACHING DYNAMIC WEB PAGES

FIELD OF THE INVENTION

This invention relates to improvements in presenting data over the Internet, and in particular, provides a mechanism for dynamically caching and validating web pages generated from data stored in a database.

BACKGROUND OF THE INVENTION

The Internet is a vast computer network consisting of many smaller networks spanning the globe. It is well known "lore" that the Internet was started in the late 1960's as development project of the U.S. Department of Defense to provide a back-up communications system that would be virtually impossible to destroy in the event of a major catastrophe. The Internet has grown exponentially, and millions of private users and corporations now use it daily for all kinds of communications needs.

The World Wide Web (WWW) was developed in 1991 as a information system running over the Internet. The WWW is based on the concept of "hypertext" and a transfer method known as HTTP (Hypertext Transfer Protocol). HTTP is designed to run primarily over TCP/IT (Transmission Control Protocol/Internet Protocol), a networking protocol that permits use of the Internet. One increasing use of the WWW is commercial—with recent improvements in secure transactions as well as graphical presentation, merchants can display and sell their goods and services over the Internet.

One format for information transfer over the WWW is to create documents using Hypertext Markup Language (HTML), a programming language that supports navigational linking ("hypertext links"). HTML is a structured language, based on SGML (Standard Generalized Markup Language), a document processing system. Like SGML, HTML describes the structure of the document through a system of tags; HTML pages are made up of standard text as well as formatting codes for headings, paragraphs, lists, tables and character styles, that indicate how the page should be displayed. HTML includes a tag called a "link tag" that provides the programming for nonlinear navigational links. One example of the use of HTML pages with navigational links in the context of business documents is described in U.S. Pat. No. 5,692,073 to Xerox Corporation for "Formless Forms and Paper Web Using a Reference-Based Mark Extracting Technique".

The WWW makes use of Uniform Resource Locator (URL) to define the address of a particular page on the Internet. The URL naming system consists of three parts: the transfer format (often "http") followed by a colon and two forward slashes (://), the name of the host machine that holds the file, and finally, the path to the file on the host machine. In a typical piece of hypertext, the data stored in the hypertext link is a label pointing to a remote destination. This is programmed in HTML by embedding the address of the link destination, the URL, in the link tag.

When a client accesses a web page, it does so through a software program called a browser which establishes the connection with the server hosting the page. The server executes corresponding server software which presents information to the client in a transfer format (eg., http) response corresponding with the web page or other data generated by the server. As the web page is initialized on the client machine, the browser renders the text and graphics for it from the HTML data.

While HTML is used to deliver data on the web, most of the underlying information is not stored in HTML, but in other, richer storage formats, such as SGML and legacy systems such as databases. The data in these other formats must often be converted to HTML dynamically. Methods for converting files from SGML to HTML, including adding "anchors" or navigational links referencing other files during the conversion, are discussed in U.S. Pat. No. 5,530,852 of Sun Microsystems, Inc., titled "Method for Extracting Profiles and Topics from a First File Written in a First Markup Language and Generating Files in Different Markup Languages Containing the Profiles and Topics for use in Accessing Data and Described by the Profiles and Topics", and in "HTML makes a great delivery vehicle for Web-based information. It just isn't a sensible place for much of that information to live in." by R. Light, *Archives and Museums Informatics*, vol. 9, no. 4, pp. 381–387, 1995.

In a commercial web site, a store sells its products to potentially millions of customers on the Internet by displaying the products through HTML documents. It is common that a merchant may have thousands of products in its catalog to sell. It is tedious, error prone and nearly impossible to manually create and manage the static HTML documents for navigating to and displaying these large number of products.

A merchant server system helps merchant manage the catalog data and provides the support to sell products on the merchant's web site. In a merchant server system, the merchants catalog data are commonly stored in a relational database. There are database tables for storing product information, tables for grouping related products together into category and related categories together into higher level category, and tables for storing category information. When a shopper goes to the merchant's web site from his browser, the merchant server accesses the data in the database through a structured query (SQL) and dynamically generates HTML documents to show the category and product pages as the shopper navigates through the merchant's store. For example, U.S. Pat. No. 5,692,181 of NCR Corporation for "System and Method for Generating Reports from a Computer Database" discusses the problems associated with organizing interrelated data in database tables, and generating customized HTML documents, in this case, reports, from data stored in relational databases.

In an electronic retail situation, a shopper usually enters the web site for a department store, for example, at the store's home page. From the home page, the shopper can click on a link to visit a top level category such as the Men's Wear department. From the Men's Wear page, he can choose the Pant section among other links to second level categories on the page. As the shopper navigates down the category hierarchy, he reaches a product page that shows a dress pant of a certain brand and the available sizes and colors. He can now pick the size and color he wants, and order the pant. The merchant server will take him through the ordering pages where he can provide the payment and shipping information. When the ordering steps are done, the order information will be recorded in the database and the merchant will be able to use this information to fulfill the order later.

While dynamically generating the category and product pages are desirable so that the merchant only needs to manage the catalog information in the database, it takes up processing cycles in the merchant server to access the database and dynamically create the HTML pages the shopper wants to see. If the web site receives heavy traffic, this can significantly slow the shopping experience. A category or product page is the same one whether it is generated the first time or subsequent times until the corresponding catalog data in the database is changed.

It can significantly reduce the load on the merchant server and improve the system performance if the generated pages can be saved for subsequent access and are re-generated only when the corresponding catalog data is changed. The shoppers will see a much better response time in navigating through the category and product pages because the pages are readily displayable from the web site once they have been "cached".

However, one problem for the merchant server is being able to maintain the validity of the cached pages automatically so that the caching function becomes completely transparent to the merchant, who will manage the catalog data as usual. That is, when the data in the database used for cached pages is changed, it would be preferable if the merchant server was able to purge invalid cache pages automatically and re-generate new ones as they are needed.

SUMMARY OF THE INVENTION

It is an object the present invention to address the design of caching the dynamically generated pages for future use while maintaining the validity of the cached pages.

Accordingly, the present invention provides a document processing system for transmitting data for display on a client machine from a server. The system consists of data storage connected to the server, a converter program in the server for transforming data from the data storage into transmissible form, such as HTML, for display on the client machine, a cache on the server for storing one or more copies of the transformed data in transmissible form, and means in the server for checking the cache for a copy of the transformed data in transmissible form before activating the converter program on receiving a request for data transmission from the client. Preferably, the data storage is a database which includes a trigger mechanism to notify the server of a change to the stored data. The server would include a synchronizer adapted to purge from the cache copies of the transformed data affected by the change to the stored data. Preferably, also, the converter program includes means for querying the client's identity, locating preferences corresponding to the client's identity and selecting data from the data storage according to the located preferences.

According to another aspect, the present invention provides a method for maintaining a valid cache of data generated in displayable form from a computer data storage. The method is executed in a computer by storing in cache at least one copy of data generated from the data storage in displayable form. On receiving a request for transmission of data in displayable form, the request is compared with the data in the cache. If a match is found, the data is transmitted from the cache. Otherwise, a copy of data from the data storage is generated in displayable form for transmission. Also, on receiving notification of a change to data in the data storage, the notification is compared with the data in the cache and, if matched, is purged from the cache.

The invention also provides a computer implemented method for generating data in displayable form from a computer data storage according to user preferences in response to a client request. The method consists of identifying the client, matching the client's identity with a predetermined preferences file, selecting data from the data storage according to the preferences file and generating the selected data in displayable form for transmission to the client.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

The invention is described in the context of function provided by the Net.Commerce product of International Business Machines Corporation. This product enables merchants to develop electronic sales channels of the type described above. However, as will be appreciated by the person skilled in the art, the concept of the invention is applicable to similar systems that perform dynamic generation of HTML pages by accessing data in a database.

In Net.Commerce, there are two command URLs to display category pages and product pages respectively. The former is ;display/category and the latter is ;display/item. The category command takes two parameters, one is the category reference number and another is the merchant reference number. Similarly, the product command takes two parameters, one is the product reference number and another is the merchant reference number. A reference number in Net.Commerce is a primary key in a database table. A category reference number uniquely qualifies which category to display, and a product reference number for which product to display.

Figure 1:
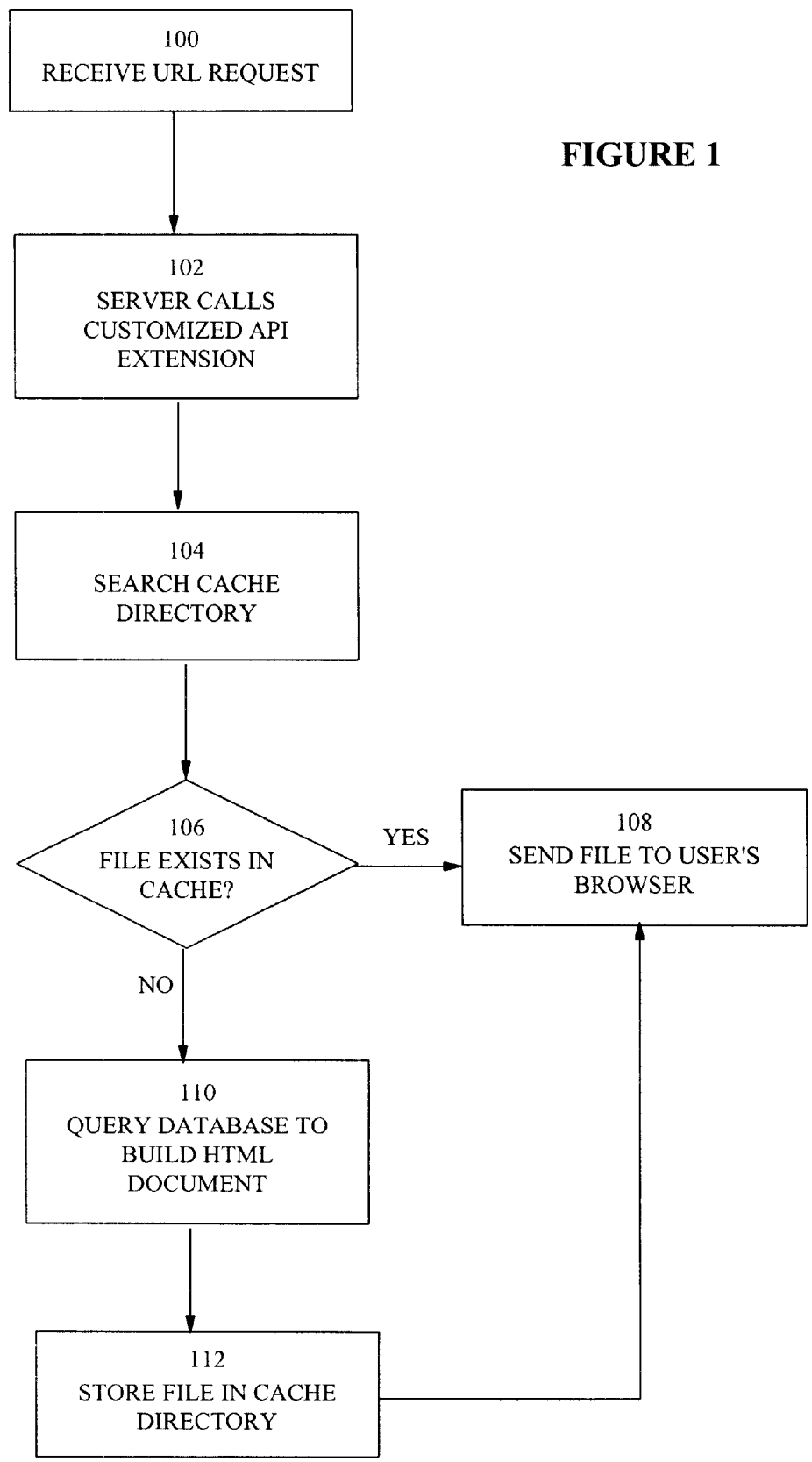
FIG. 1 is a flow diagram illustrating the steps for obtaining a page from a merchant server for display by a shopper's browser.

As shown in FIG. 1, cache pages are created on demand. This means that they are not stored into the file system until requested. With the help of the caching function in Net.Commerce, each time a user requests a product or category page, upon receiving the URL request (block 100), the web server calls a customized API extension provided by Net.Commerce to search a cache directory (the location has been configured during installation) for the requested file (blocks 102, 104). If the file exists in the cache, it is immediately sent to the user's browser (blocks 106, 108). If the file is not in the cache, it must be generated dynamically in the usual way. The database is queried to build the HTML document (blocks 106, 110). It is then returned to the user's browser (block 108), and is also captured and stored in a file in the cache directory, where it will be available the next time it is requested (block 112).

File names created in the cache will typically look like this:

cgmenbr1__cgrfnbr5__.ncibm prmenbr1__prrfnbr8__.ncibm

These files would be created by caching the results of the commands

;display/category?cgmenbr=1&cgrfnbr=5 and

;display/item?prmenbr=1&prrfnbr=8, respectively.

In the above examples, "5" is the value of the category reference number (cgrfnbr) in the first command and "8" is the value of the product reference number (prrfnbr) in the second. In both cases, the merchant reference number is "1".

Figure 2:
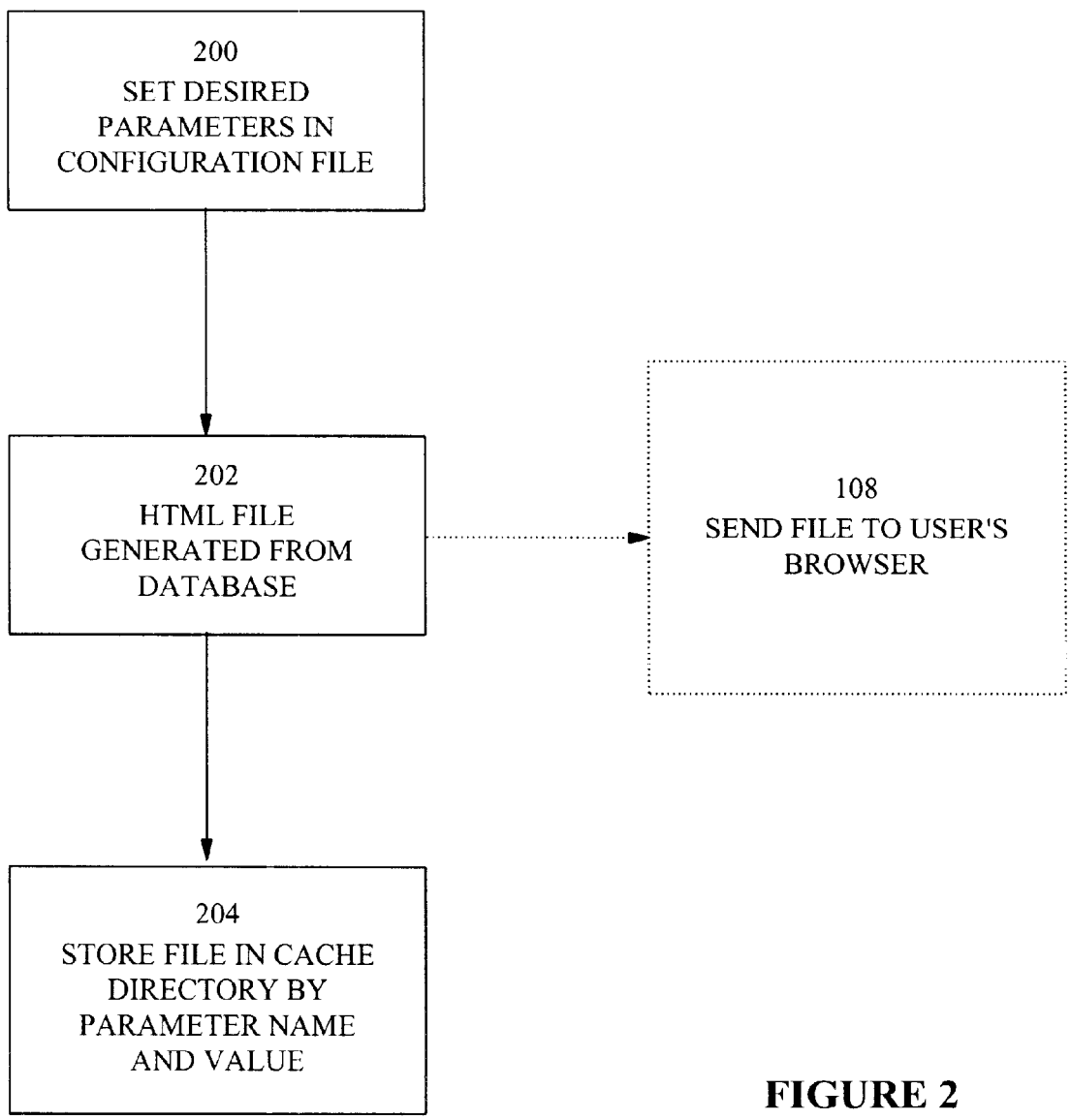
FIG. 2 is a flow diagram illustrating a method for creating cache files based on special parameters.

By default, files are only cached based on product or category reference numbers. Anyone requesting a product or category page using the display command would receive the same file from the cache. However, the present invention provides a means to display different product or category pages based on parameters other than the products or categories themselves, and this is illustrated in FIG. 2 and discussed below. The additional parameters are termed as "significances" here.

The way that files are cached can be customized by setting the significances in a configuration file (block 200). To do this, significances on the following lines can be entered in the configuration file, separated by commas, using the following syntax:

.NC_$_{CAT}$_SIG_PARMS parameter_name(s) (if the parameter is for the display category command)

NC_ITEM_SIG_PARMS parameter_name(s) (if the parameter is for the display product command)

where "parameter_name" is the name of an additional parameter passed to the display command.

Significances affect the file names of the cached files, refining the way they can be displayed, and they are passed to the caching utility as display commands. The significance causes the HTML files generated by the display command (blocks 202, 108) to be stored in the cache using file names that contain the parameter name and its value on the command (block 204). When the user requests a page containing those parameters, the caching utility will now be able to distinguish that page in the cache by its file name following the method described above and illustrated in FIG. 1.

An example to illustrate the use of significance follows. A merchant needs to display unique product pages to members of different shopper groups in its store. A Shopper Group table is provided in the Net.Commerce database for storing the shopper group information. In the present example, there three shopper groups in the table under the names "Gold", "Silver" and "Platinum". Their shopper group reference numbers are "1", "2" and "3", respectively. Because category and product pages with different contents will be dynamically created for different shopper groups, a significance is added to the configuration file to distinguish the different shopper groups, so that different files will be stored in the cache for different shopper groups. The following line is added to the configuration file:

NC_ITEM_SIG_PARMS sgrfnbr where "sgrfnbr" is the parameter to differentiate the shopper groups.

Next, the parameter "sgrfnbr" is added to the ;display/item command. For example, the command ;display/item?prrfnbr=10&prmenbr=1&sgrfnbr=3 requests a page for a member of the third shopper group, the "Platinum" group. It passes parameter for the shopper group in addition to the default product and merchant reference numbers. When a significance such as sgrfnbr in this example is added, the cached file name would appear as:

prmenbr1_prrfnbr10_sgrfnbr3_.ncibm where "10" is the product reference number and "3" is the value of the name/value pair (sgrfnbr=3) in the ;display/item command.

By adding the significance, file names are created in the cache that the caching utility will recognize. A separate file will be cached, and can therefore be served, based on each significance.

To maintain the validity of the cache files, a synchronization daemon, a housekeeping or maintenance utility, in Net.Commerce automatically handles file purging by deleting cache files that contain product or category information that has been changed or deleted. The daemon relies on the records in a specific table called CACHLOO in the Net.Commerce database to identify cache files that contain product or category information that has been changed or deleted.

Figure 3:
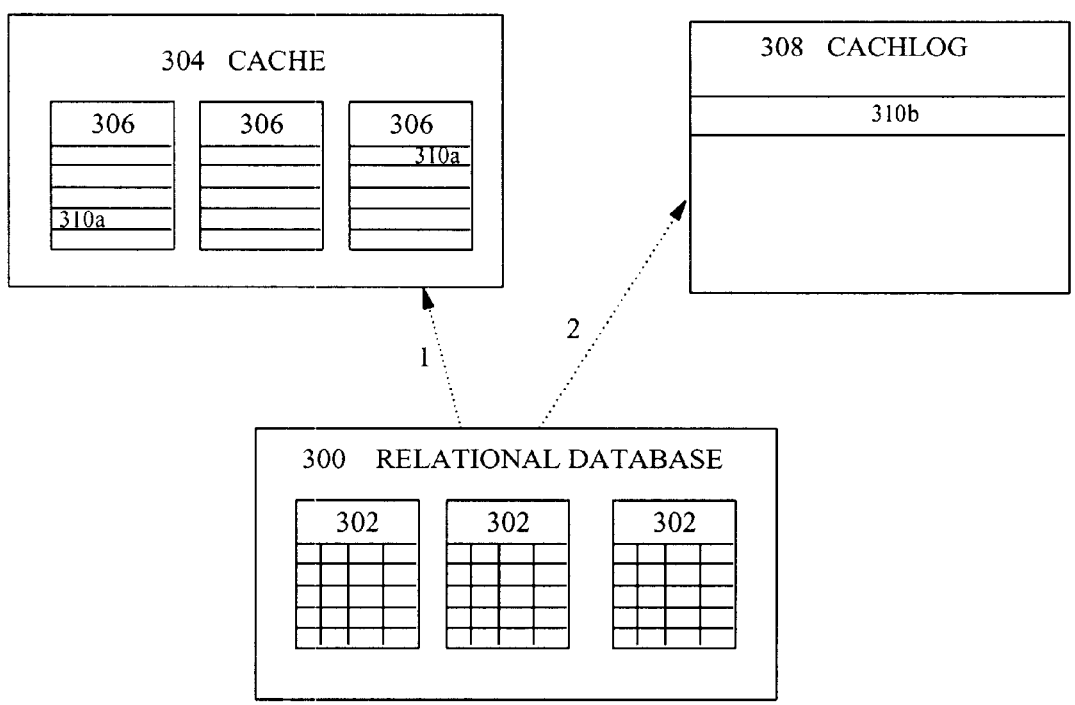
FIG. 3 is a schematic diagram showing elements of the preferred embodiment of the invention.
Figure 4:
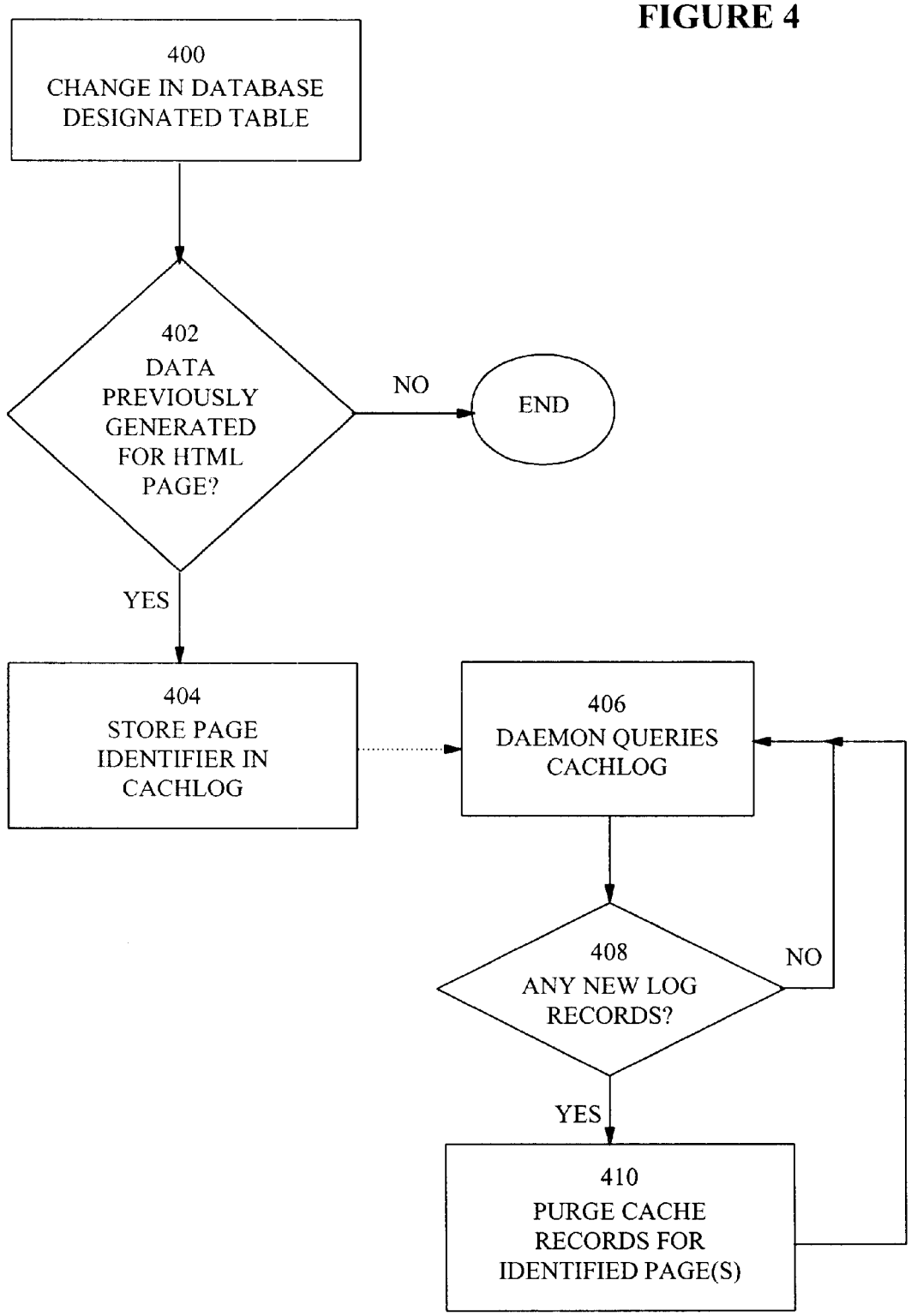
FIG. 4 is a flow diagram illustrating a method for maintaining validity of the cache when updates to the data stored in the database have been made.

The records in CACHLOG are created as illustrated in FIGS. 3 and 4 and described below.

As shown in FIG. 3, the Net.Commerce product provides web page delivery for product information contained in a number of tables 302 in a relational database 300. The CACHLOG table 308 is for identifying what cache pages 306 need to be purged from cache 304 as a result of changes in the data contained in tables 302 in the database 300.

Information that a change has been made is propagated by triggers installed on the database tables. In the preferred embodiment, triggers are installed on the following product- and category-related tables:

PRODUCT (the product table)
PRODPRCS (the product price table)
PRODATR (the product attribute table)
PRODDSTATR (the product distinct attribute table)
PRODSGP (the product shopper group template table)
CATEGORY (the category table)
CGRYREL (the category relationship table)
CGPRREL (the category product relationship table)
CATESGP (the category shopper group template table)

A record 310b in the CACHLOG table 308 contains a name-value pair which identifies one or more cached pages that need to be purged. The same name-value pair was used to generate the file names 310a of these pages in the ;display commands previously.

For example, a page resulted from the command ;display/item?prrfnbr=123&prmenbr=2 is cached with a file name containing the name-value pair "prrfnbr" and "123". As shown in FIG. 4, when a database record associated with the product of product reference number equal "123" is changed (block 400) for a page previously generated in HTML (block 402), a record having the name-value pair "prrfnbr" and "123" will be created in the CACHLOG table by the corresponding database trigger (block 406).

The synchronization daemon periodically queries the CACHLOG table to determine whether any new log records have been added (block 408), and purges cache files which may be affected by the changes in the database (block 410). In the example above, the daemon will purge all pages having the name-value pair "prrfnbr" and "123" on their file names. In fact, in the preferred embodiment, the synchronization daemon purges more pages in order to maintain cache validity. In this example, all cache pages of the categories to which the product "123" is belonged will be purged.

The merchant may need to create a custom trigger if a custom table has been created from which information is retrieved to create product or category pages. For example, the merchant may create a table, PRODEXTINFO, that contains extra text information about products to be included in the displayed pages. The table contains a column, PEPRNBR, that is a foreign key to the product reference number, and another column, PETEXT, that contains the text itself. Because column PETEXT is selected in an SQL query when generating the product page, a cache file created from information retrieved must be purged when the PETEXT value for a product has changed. If the merchant server updates PETEXT in the record with PEPRNBR equal 10, the custom trigger created on this table will log the following record to the CACHLOG table:

('prrfnbr', 10, CURRENT TIMESTAMP)

Now, when the synchronization daemon accesses the CACHLOG table, it will discover a new record and will delete all product pages pertaining to the product with reference number "10".

The embodiments of the invention in which an exclusive property or privilege is claimed are defined as follows:

1. A document processing system for transmitting data for display on a client machine from a server, comprising:

data storage connected to the server, said data storage including a trigger mechanism to notify the server of a change to the stored data;

a converter program in the server for transforming data from the data storage into transmissible form for display on the client machine;

a cache on the server for storing one or more copies of the transformed data in transmissible form; and means in the server for checking the cache for a copy of the transformed data in transmissible form before activating the converter program on receiving a request for data transmission from the client wherein said server further comprises a synchronized adapter to purge from the cache copies of the transformed data affected by the change to the stored data.

2. A document processing system, according to claim 1, wherein the transmissible form is Hypertext Markup Language.

3. A document processing system, according to claim 1, wherein the data storage is a database.

4. A document processing system, according to claim 3, wherein the database is a relational database.

5. A document processing system, according to claim 1 or 3, wherein the server further comprises:

log identifying copies of transformed data affected by the change to the stored data; and a synchronizer adapted to walk the log to identify said copies of the transformed data affected by the change to the stored data and to purge said identified copies.

6. A document processing system, according to claim 1, wherein the converter program includes means for:

querying the client's identity;

locating preferences corresponding to the client's identity; and selecting data from the data storage according to the located preferences.

7. A document processing system, according to claim 1, wherein the means in the server for checking the cache includes means for:

querying the client's identity;

locating preferences corresponding to the client's identity; and selecting data from the data storage according to the located preferences.

8. A document processing system for transmitting data for display on a client machine from a server, comprising:

data storage connected to the server, wherein the data storage includes a trigger mechanism to notify the server of a change in the stored data;

means for selecting data from the data storage in response to receiving a request for data transmission from the client;

a converter program in the server for transforming the selected data from the data storage into transmissible form for display on the client machine;

a cache on the server for storing one or more copies of the transformed selected data in transmissible form; and means in the server for checking the cache for the copy of the transformed selected data in transmissible form before activating the converter program on receiving a request for data transmission from the client wherein the server further comprises a synchronizer adapted to purge from the cache the copy of the transformed selected data if said selected data is affected by the change to the stored data.

9. A document processing system, according to claim 8, wherein the transmissible form is Hypertext Markup Language.

10. A document processing system, according to claim 8, wherein the data storage is a database.

11. A document processing system, according to claim 10, wherein the database is a relational database.

12. A document processing system, according to claim 8 or 10, wherein the server further comprises:

a log identifying the copy of the transformed selected data if said selected data is affected by the change to the stored data; and a synchronizer adapted to walk the log and to purge the transformed selected data if said transformed selected data is identified in the log.

13. A document processing system, according to claim 8, wherein the converter program includes means for:

querying the client's identity;

locating preferences corresponding to the client's identity; and selecting data from the data storage according to the located preferences.

14. A document processing system, according to claim 8, wherein the means in the server for checking the cache includes means for:

querying the client's identity;

locating preferences corresponding to the client's identity; and selecting data from the data storage according to the located preferences.

* * * * *